Aug. 15, 1939. F. M. GIDDINGS 2,169,414
UTILITY SCRAPER AND TOOL
Filed May 2, 1938 2 Sheets-Sheet 1

Inventor:
Fred M. Giddings.
By John F Brezina Att'y

Aug. 15, 1939.  F. M. GIDDINGS  2,169,414
UTILITY SCRAPER AND TOOL
Filed May 2, 1938   2 Sheets-Sheet 2
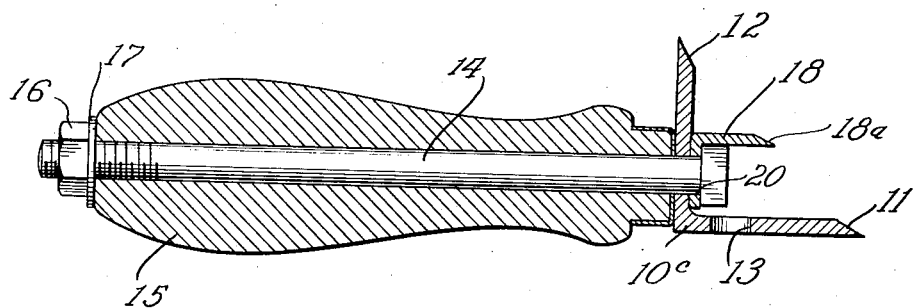
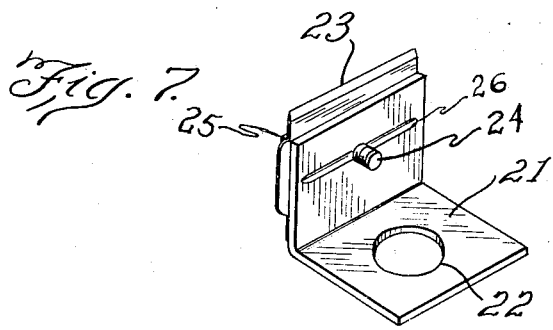
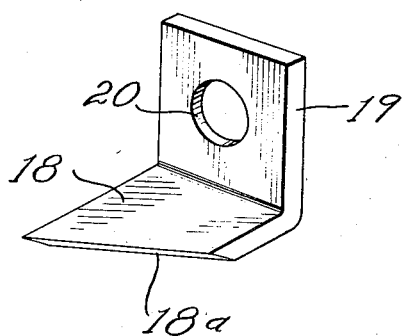
Inventor:
Fred M. Giddings.
By:- John F. Brezina
Atty.

Patented Aug. 15, 1939

2,169,414

UNITED STATES PATENT OFFICE 2,169,414

UTILITY SCRAPER AND TOOL

Fred M. Giddings, Galesburg, Ill.

Application May 2, 1938, Serial No. 205,410

4 Claims. (Cl. 30—172)

This invention relates to a double edged scraper of double edged utility tool wherein both edges of the scraper are adapted to be used for and to cooperate in the same function simultaneously.

An important object of my invention is the provision of a double edged scraping tool having a pair of relatively sharp edges lying in the same plane and the body portion of which is composed of a pair of integral metal sections angularly disposed with respect to each other and having a handle removably mounted thereon.

A further object of my invention is the provision of an inexpensive double edged scraper, utility tool or smoothing plane which has a pair of substantially parallel cutting edges adapted to cut and scrape simultaneously upon the same surface and to perform a common function, and which is relatively easily resharpened to form a concave beveled edge terminating in a relatively sharp cutting, scraping, and levelling edge, respectively.

A further object of my invention is the provision of an inexpensive, easily manufactured double edged scraper, both edges of which are adapted to cooperate and to act simultaneously upon the same surface to scrape, cut or level the same and which has a handle removably mounted so that said handle may be secured in an angular position with respect to either one of the two angularly disposed integral sections of the scraper body.

A further object of my invention is the provision of a cutting tool of the described class adapted particularly for cutting the longitudinal edges of fibrous boxes and other containers and whereby one of the sections of the said tool acts as a support and guide simultaneously with the cutting action of another portion thereof in order to guide the said cutting portion.

Other and further important objects of my invention will be apparent from the following description, claims, and accompanying drawings.

Fig. 5 is a vertical cross sectional view of my scraper device with the auxiliary cutting knife attached thereto and which is adapted to cooperate with the angular sections of the sharpened body as hereinafter described.

Fig. 6 is a perspective view of the auxiliary cutting blade when removed from the scraper.

Fig. 7 is a perspective view of an auxiliary cutting knife mountable as illustrated in Fig. 5 and employing a removable and replaceable cutting element such as a razor blade.

Figure 1:
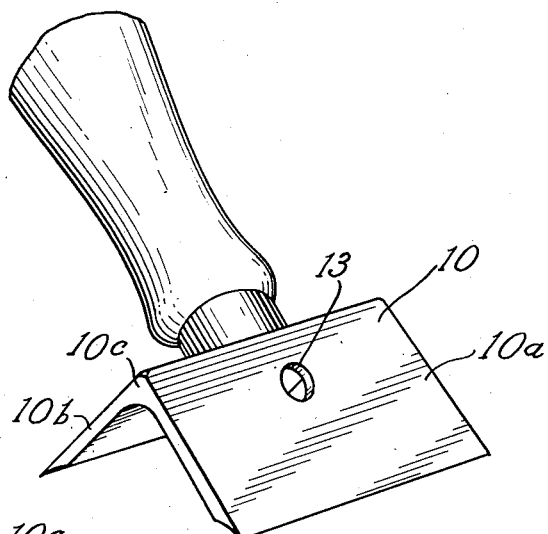
Fig. 1 is a perspective view of the scraper device of my invention illustrating its normal position wherein both blades are used simultaneously for the same function.
Figure 2:
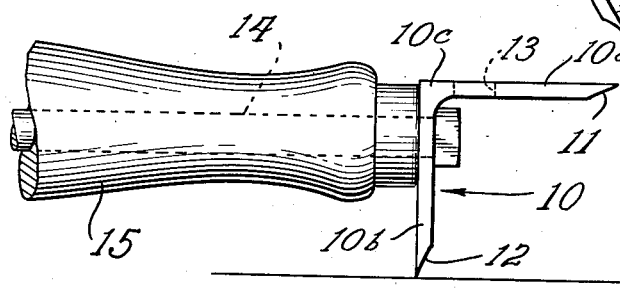
Fig. 2 is a side elevation view with parts broken away illustrating one position of the scraper wherein the upper body section would be used as a pressure blade to be depressed by the hand.

Referring to Figs. 1 to 4 inclusive, reference numeral 10 designates a metal body composed of a pair of integral sections 10a and 10b which are disposed with respect to each other either at right angles or any other desirable angle and which merge at a relatively thicker junction 10c to impart strength and avoid the possibility of either of the sections bending in use. The longitudinal edges of body sections 10a and 10b are preferably parallel and lie in the same plane as illustrated, and said longitudinal edges are ground or beveled to form beveled or ground surfaces 11 and 12 which terminate in relatively sharp cutting edges respectively. The said ground or beveled edges face inwardly of the angle of the sections 10a and 10b for purposes which will be apparent from the description and the claims. Said ground and beveled surfaces 11 and 12 are also preferably hollow ground and slightly concave so as to present a relatively thin pointed cutting and scraping edge.

Figure 3:
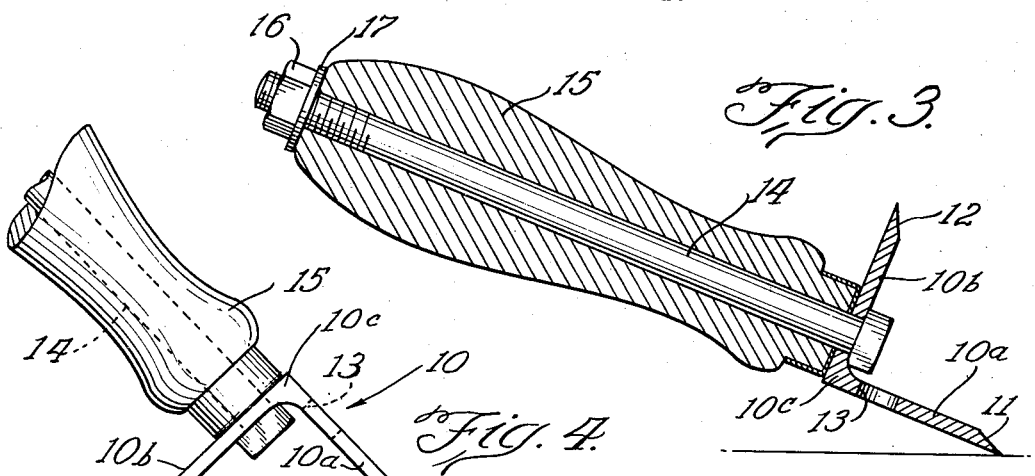
Fig. 3 is a vertical cross section view of my scraper illustrating the means for removably mounting the scraper blade with respect to the handle.
Figure 4:
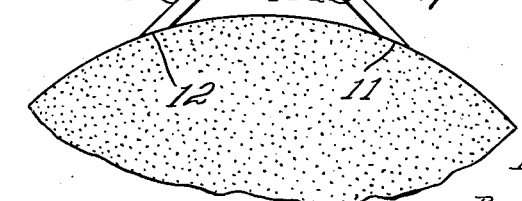
Fig. 4 is a side elevational view with parts of the handle portion broken away illustrating one position of the scraper in use on a rounded surface wherein both of the sharpened portions would be used simultaneously in smoothing and levelling the surface, and also illustrating the position in which the scraper could be ground upon an emery wheel.

The scraper body sections 10a and 10b each have an aperture 13 formed therein substantially midway between the opposite ends and preferably relatively close to the juncture 10c of said body sections. A bolt 14 is removably mounted as illustrated in Figs. 3 and 5 in either one of the apertures 13 and extends through a central longitudinal passage of a suitable handle 15 of desired shape. Said handle 15 is securely mounted on said bolt and with respect to said scraper body by nut 16 and interposed washer 17, the former of which is tightened upon the threaded end of the bolt 14. The handle 15 may be easily and quickly removed when it is desired to change the position of the scraper body so that the opposite blade will be disposed perpendicularly with respect to the longitudinal axis of said handle. In either position of the handle, both the beveled or sharpened edges are used simultaneously in a number of uses of this tool, as for example, in the scraping of rough wood or other rough surfaces, also boat or other surfaces from which varnish, paint, or other adhered material is to be removed. In this type of work, when the user grips the handle with one hand he will frequently also place the palm of the other hand upon the flat portion of the other blade, utilizing it as a pressure unit, to apply the desired degree of pressure. As the user draws the tool along the surface with both the sharpened edges upon the surface, one of the sharpened edges, for example, edge 12, will scrape, level, and smoothen while the other beveled edge will always level, plane, and smoothen the same surface simultaneously, this being especially desirable in the scraping of relatively fibrous surfaces such as uneven wood, certain types of pressed board, wall board, and the like. When the user pushes the scraper tool in the opposite direction, the forward blade cuts and scrapes to a sharper degree and the sharpened edge which is substantially perpendicular to the handle will simultaneously scrape, smoothen and plane the same surface to a lesser degree. This is especially true when the scraper is used upon a substantially flat surface as differentiating from a rounded surface.

Referring to Figs. 5 and 6, this illustrates the same scraper as illustrated in Figs. 1 to 4 except having an added blade 18 thereon which is shown in perspective view in Fig. 6. Blade 18 is formed of metal and has a right angled shank 19 with an aperture 20 therein, and has its sharpened or beveled edge 18a cut along an oblique or diagonal line non-parallel to the plane of shank 19. The sharp or beveled edge 18a terminates in a relatively sharp cutting edge. The cutting and scraping tool as illustrated in Fig. 5 is particularly adapted for cutting along the edge of paper or fibrous board containers which, as is well known, have straight edges, and in use, the body section, which is parallel to the cutting blade 18, is placed flat upon the top or cover of the fiber board carton thereby serving as a support and guide and the pointed end of the sharpened edge 18a is stuck into and through said wall of the carton or container and thence the user pulls the tool along the entire side wall of the carton or container simultaneously applying pressure to cause the sharpened edge 18a to form a slit traversing the wall of the box or container along a line a short distance below the top or cover thereof. It will be apparent that the blade section which is parallel to the cutting blade 18 serves as a support and guide during the formation of said slit in the box, and by cutting completely around the three or more sides of the box, the top or cover may be hinged into open position or entirely removed.

Referring to Fig. 7, this merely illustrates a modified form of a blade 21 which operates identical to the blade of Fig. 6 herein described, except that it differs in construction in being formed of two sections, namely, a right angled shank portion 21 which has an aperture 22 whereby the same is mounted upon the bolt 14 in the same manner as illustrated in Fig. 5. The outer portion of the shank portion 21 is formed with a longitudinal slot 26 to provide for the mounting of a replaceable blade, such as a razor blade, 23, so that it may be quickly and easily removed and replaced with another blade to perform functions such as above described relative to the unit of Fig. 5. A plate 25, a corner of which is shown at the left of Fig. 7, is suitably apertured to receive a bolt and nut 24 which extends into the longitudinal slot 26 as illustrated in Fig. 7. Tightening of the nut causes the plate 25 to firmly clamp the blade into the position illustrated in Fig. 7, and when it is desired to remove the same, the nut is removed and the plate and bolt dismounted and a new blade remounted in the described manner. By providing a replaceable blade 23 in the described manner, the necessity for frequent sharpening is eliminated.

The scraper tool of my invention is adapted for numerous uses other than those which have been herein referred to, and wherever a scraping, planing, cutting or smoothing function is desirable.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim as my invention:

1. In a multi-blade scraper, an elongated body of substantially right angled cross section and presenting a pair of spaced apart longitudinal edges, the longitudinal edges of the two sections of said scraper body being ground to present a concave beveled surface and form a relatively sharp scraping edge, each body portion being apertured, and a bolt threadingly mountable in either of said body section apertures, and a centrally passaged cylindrical handle on said bolt, said handle and bolt being mountable with respect to either of said apertures.

2. In a scraping device of the described class, a metal body composed of two integral sections in substantially perpendicular planes and forming a pair of substantially parallel spaced apart longitudinal edges, said edges being formed to present a concave internally beveled surface and forming a pair of relatively sharp cutting and scraping edges respectively; each of said sections having an aperture therethrough; a handle mounted angularly with respect to one of said apertures, and a bolt engaging said handle and extending through said aperture for securing said handle to said scraper body.

3. In a cutting and scraping tool of the described class, a metal body of substantially right angled cross section and composed of a pair of substantially flat integral sections, one thereof having an aperture therein; a bolt extending through said aperture, a handle on said bolt extending in the direction opposite to the other of said integral sections; and an apertured right angled metal member terminating in a relatively narrow longitudinally recessed portion adapted to receive a removable cutting blade, said bolt extending through the aperture of said metal member to securely mount the same.

4. In a cutting and scraping tool of the described class, a metal body of substantially right angled vertical cross-section and including a pair of substantially flat integral sections terminating in relatively sharp longitudinal edges; a handle removably mounted on said metal body and extending in a direction opposite to that of one of said sections; a right angled bracket member mounted upon one of said body sections and extending substantially parallel to the other of said sections, the projecting portion of said bracket member having a longitudinal recess therein to permit mounting of a cutting blade; and a cutting blade removably mounted in said recess of said bracket member, and means associated with the projecting portion of said bracket for securing such cutting blade, the body section parallel to said blade mounting member being adapted to serve as a support and guide during the cutting action of said cutting blade.

FRED M. GIDDINGS.